Aug. 14, 1923.

B. C. PALMER 1,464,882

MOUNTING FOR TAXIMETERS

Filed April 6, 1921     2 Sheets-Sheet 1

Inventor
B. C. PALMER

WITNESSES:

By

Attorney

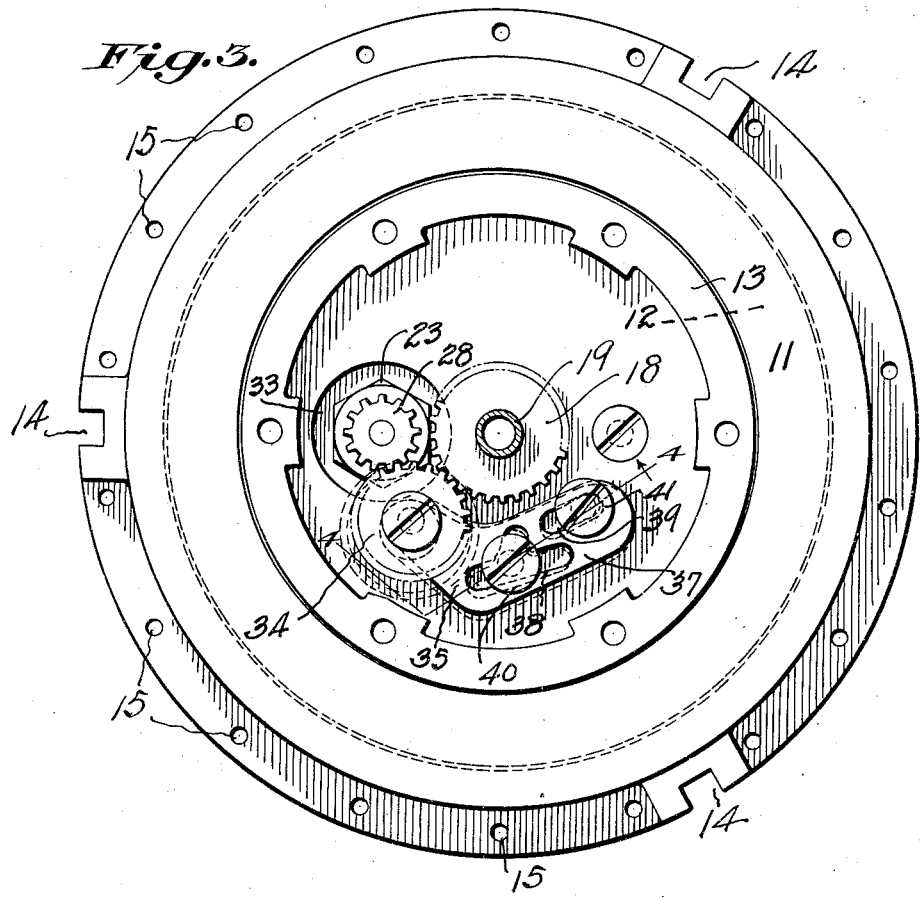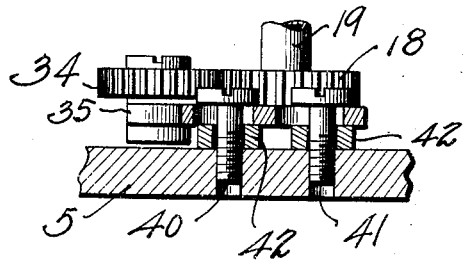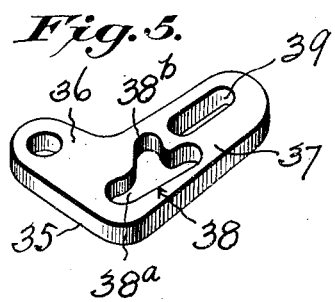

Patented Aug. 14, 1923.

1,464,882

UNITED STATES PATENT OFFICE.

BRIAN CHARLES PALMER, OF NEW YORK, N. Y., ASSIGNOR TO AMERICAN TAXIMETER COMPANY, OF NEW YORK, N. Y., A CORPORATION OF NEW YORK.

MOUNTING FOR TAXIMETERS.

Application filed April 6, 1921. Serial No. 459,028.

*To all whom it may concern:*

Be it known that I, BRIAN C. PALMER, citizen of the United States, residing at New York, in the county of New York and State of New York, have invented certain new and useful Improvement in Mountings for Taximeters, of which the following is a specification.

This invention relates to an improved support or mounting for taximeters.

To that end the present invention proposes to provide a construction that enables the meter to be installed on the vehicle with facility, and likewise removed by authorized persons when necessity requires, while at the same time providing a support which allows the meter to be mounted on an axis permitting its register face to be turned to any desired position with reference to the driver's seat, or occupant of the cab.

Heretofore, the devices employed for supporting the meter have been more or less troublesome and tedious to install, and also have been difficult to adjust, and in most cases are open to the objection of exposing the connections between the driving cable and the meter mechanism to unauthorized tampering, thereby impairing the accurate functioning of the meter. Accordingly, a primary object of the invention is to provide a novel support including means whereby the meter may be circumferentially adjusted and effectively locked against removal, as well as providing a tamper-proof connection between the driving cable and the driving pinion.

Another object of the invention is to provide novel means for carrying the reversing idler pinion which transmits motion from the driving pinion to the clutch pinion. That is to say, it is proposed to provide an adjustable mounting for the idler pinion whereby the same may be readily shifted to meet different sizes of clutch pinions which vary in accordance with different tariffs and different operating conditions, and also facilitates the installation and adjustment of the tamper-proof cable connection above referred to.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings in which:

Figure 3 is a horizontal sectional view taken on the line 3—3 of Figure 1.

Figure 4 is an enlarged detail sectional view taken on the line 4—4 of Figure 3 and better illustrating the adjustable mounting for the idler pinion.

Figure 5 is a detail perspective view of the adjustable carrier for the idler pinion.

Similar reference numerals designate corresponding parts throughout the several figures of the drawings.

Figure 1:
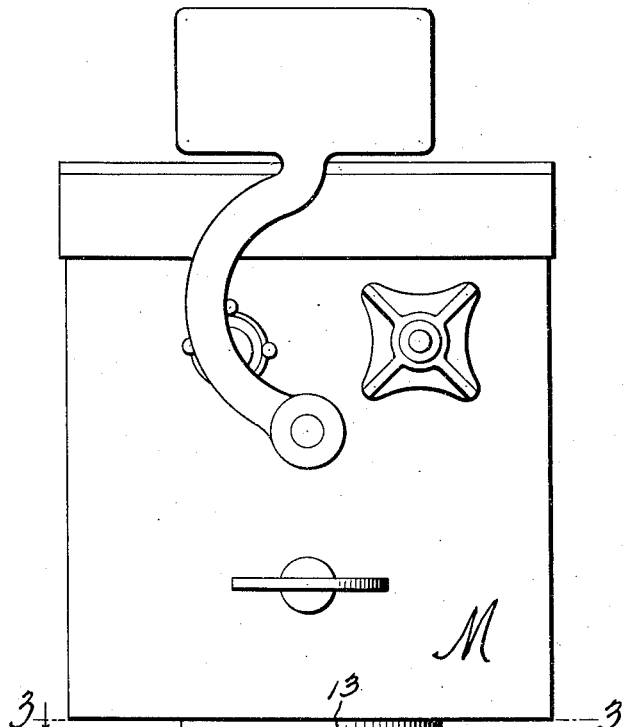
Figure 1 is an elevation of a taximeter mounted in accordance with the present invention.
Figure 2:
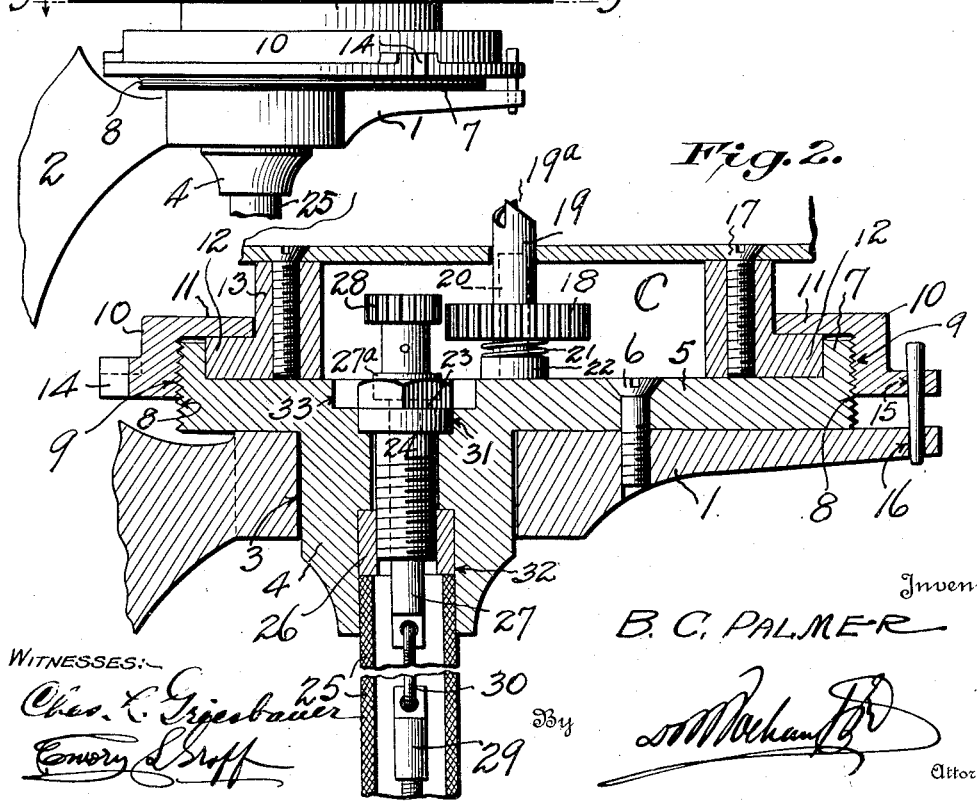
Figure 2 is an enlarged vertical sectional view of the improved mounting.

In carrying forward the foregoing objects it is proposed to provide a relatively substantial bracket 1 having any suitable and convenient form of attaching portion 2, and formed with the opening 3 for receiving the relatively large cable receiving boss 4 eccentrically carried by the base 5 of the coupling device. As shown in Figure 2 the said base 5 is preferably securely held to the bracket 1 by suitable fastenings 6, the heads of which are exposed at the inner face of the said base and therefore hidden from outside view.

The said base 5 is also provided at its outer edge with an upstanding coupling flange 7 that is exteriorly threaded as at 8 to receive the interiorly threaded portion 9 of the locking ring 10 which is formed with an offset clamping flange 11 for engaging with and holding the offset annular shoulder 12 of a stand or collar 13 carried by the base of the meter M. The outer periphery of said locking ring is preferably provided with the notches 14 for facilitating the use of a tool in the installation and removal of the ring, as well as a plurality of locking holes 15 for registering with similar holes 16 in the bracket 1 to receive a cotter pin or wire seal, or both, to lock and seal the parts against unauthorized separation. The shouldered collar 13 carried by the bottom of the meter is preferably secured to the lower wall thereof by screws or equivalent fastenings 17, and the said shoulder 12 thereof has a snug fit within the upstanding portion of the coupling flange 7 of the base plate, so that when the locking ring 10 is screwed into position, the parts will be firmly held against longitudinal separation.

As will be observed from Figure 2 the said stand or collar 13 is preferably of sufficient height to provide a chamber C of adequate size for housing the driving connections for the meter. These driving connections preferably consist of a clutch pinion 18 mounted on a hollow clutch sleeve 19 and adapted to be journaled upon a post 20 located at the axis of the circular flange 7 of the base 5. The collar 13 carried by the bottom of the meter is also placed concentric with the post 20 so that by reason of this the entire meter M may be shifted circumferentially to bring its register face to any desired point of view.

With further reference to the clutch pinion 18 above referred to it will be observed that the same is preferably resiliently mounted on the spring 21 having the abutment ferrule 22 at its lower end. By mounting the clutch pinion 18 in this way, the clutch end 19ª will always be pressed into contact by the mating part of a clutch in the meter mechanism, while at the same time the said pinion 18 may always be readily removed from the post 20 when the meter is dismounted to thereby facilitate access to the nut head 23 of the hollow cable holding bolt 24 to be presently referred to. The principal advantages of the described manner of mounting the clutch pinion is that different size clutch pinions may be readily substituted to compensate for differences in tire sizes of the vehicle which carries the meter as well as adapting the meter to different tariff rates. For example, if the original pinion is intended for a tariff rate of ten cents per quarter of a mile, and it is necessary to change the rate to ten cents per one third of a mile, the arrangement set forth makes it possible to readily substitute another size gear to take care of the change in tariff.

Another feature of practical importance is the novel arrangement for connecting the hollow cable and flexible driving shaft with the base of the mounting. As will be seen from Figure 2 of the drawings the hollow cable 25 is provided with an interiorly threaded supporting ferrule 26 adapted to be engaged by the threaded portion of the bolt 24 previously referred to, and which bolt is hollow to thereby accommodate the drive spindle 27 that carries the driving pinion 28 at its upper end and connects at its lower end with the flexible drive shaft 29 through the wire clip 30, as shown. The head 23 of the cable supporting bolt 24 is provided with a socket for receiving the collar 27ª of the drive spindle, and the said head itself preferably rests in a socket or well 31 in the eccentric boss 4. In order to permit the engagement of the head 23 of the bolt by a suitable tool for rotating the bolt in a direction to cause the threads to draw the ferrule 26 into the cable socket 32 of the boss, the bottom wall of the base is provided with a tool head clearance 33. It will thus be apparent that when the bolt 24 is turned in the boss it will draw the ferrule of the cable into the socket 32 of the boss and thus hold the cable securely to the base, and by reason of the fact that the ferrule is drawn well up into the socket 10 it is inaccessible to outside tampering or meddling.

For the purpose of transmitting motion from the drive pinion 28 to the clutch pinion 18 a suitable intermediate idler pinion 34 is employed. This idler pinion 34 is mounted upon a shiftable carrier 35, whereby the said pinion may be moved to compensate for different size clutch pinions, and to also swing clear of the head 23 of the bolt and permit a tool to engage therewith, as will be apparent. As to the particular manner of mounting the shiftable carrier 35 shown in the drawings, it will be observed from Figures 4 and 5 that the said carrier is preferably of angular formation, the pinion 34 being carried by the offset arm 36 while the body portion 37 thereof is provided with a three way adjustment slot 38 and a relatively straight holding slot 39. The said slots 38 and 39 preferably receive the clamping screws 40 and 41, and for the purpose of maintaining the carrier arm at the desired height above the floor of the base 5 suitable spacing washers 42 may be employed. The three way slot 38 is intended to enable the idler pinion 34 to be shifted to a position to clear the head 23 of the bolt when the arm is shifted in the straight-a-way portion 38ª of the slot, while the offset or spur portion 38ᵇ thereof permits the shifting of the idler pinion radially from the axis of the clutch pinion to accommodate clutch pinions of different diameters as heretofore indicated.

From the foregoing it is thought that the distinctive features and advantages of the present improvements will be readily apparent without further description, and it will of course be understood that changes in the form, proportion and minor details of construction may be resorted to without departing from the spirit of the invention or scope of the appended claims.

I claim:

1. A mounting for taximeters including in combination, a base, a meter supporting element, clamping means for adjustably connecting the meter supporting element to the base, and means for locking said clamping means to prevent unauthorized release thereof.

2. A mounting for taximeters including in combination, a base, and means for adjustably locking a meter to the base whereby the same may be shifted circumferentially.

3. A mounting for taximeters including in combination, a base having a coupling flange, a meter supporting element having a shoulder portion fitting within said flange, and means for engaging with said flange and having a clamping engagement with the shoulder portion of the meter supporting element fitting therein.

4. A mounting for taximeters including in combination, a bracket, a base secured to said bracket and having an exteriorly threaded flange, a shouldered collar adapted to be carried by the meter, and a locking ring being interiorly threaded for engaging with and holding the shouldered collar within the flange of the base.

5. A mounting for taximeters including in combination, a base having an axially arranged post, and means carried by the meter for supporting the same on the base whereby the meter may be circumferentially shifted about the axis of the said post, and means for locking the base and the said means carried by the meter together.

6. A mounting for taximeters including a base having a centrally arranged post, a stand carried by the meter and adapted to rest on said base concentric to said post whereby the meter may be shifted circumferentially about the axis of the post, and means for locking the stand and base together.

7. A mounting for taximeters including in combination with a bracket having an opening, a base plate supported on the bracket, a cable receiving boss carried by the base plate and adapted to fit in said opening, and adjustable cable supporting means carried by the boss.

8. A mounting for taximeters including a base having a boss provided with a cable receiving socket and interior nut receiving socket in open communication with each other, means having a portion lying within the nut receiving socket and a portion extending into the cable receiving socket for engaging with and holding the end of the cable within the socket.

9. A mounting for taximeters including a base having a boss provided with an exteriorly opening cable receiving socket formed with an abutment shoulder and an interior socket, a hollow cable, a locking element having a portion lying within the interior socket and projecting into the cable receiving socket to engage with the said cable to thereby hold the same well within the mouth of said exteriorly opening socket.

10. A mounting for taximeters including a base plate having an integral offset tubular portion, a flexible driving cable, and adjustable means cooperating with the said offset tubular portion to engage and hold the end of said cable concealed therein.

11. A mounting for taximeters including a base having a tubular portion provided with sockets at opposite ends thereof, a cable having an interiorly threaded ferrule adapted to fit in one of said sockets, and a hollow bolt having an enlarged head portion adapted to lie in the other of said sockets and having its shank portion exteriorly threaded to engage with the interiorly threaded ferrule of the cable.

12. A mounting for taximeters including a base having a centrally located upstanding post, a clutch pinion adapted to be carried by said post, an eccentrically mounted driving pinion, a reversing idler pinion for transmitting motion from the driving pinion to the clutch pinion, said clutch pinion, driving pinion and reversing idler pinion operatng in the same plane and means for shiftably mounting said reversing idler pinion with respect to the clutch and driving pinions.

13. A mounting for taximeters including a base having a centrally located post, a clutch pinion adapted to be carried by said post, an eccentrically mounted driving pinion, a reversing idler pinion for transmitting motion from the driving pinion to the clutch pinion, and means for shiftably mounting said idler pinion consisting of a slotted carrier member, and posts carried by the base and engaging with said slotted carrier member.

14. A mounting for taximeters including a base, a clutch pinion supported on said base, a driving pinion carried by the base at one side of the clutch pinion, and a reversing idler pinion mounted to shift radially and tangentially with reference to the clutch pinion.

15. A mounting for taximeters including in combination, a base, a clutch pinion detachably carried by the base, a driving pinion having a fixed location in the base at one side of the clutch pinion, a reversing idler pinion for transmitting motion from the driving to the clutch pinion, and means for mounting said reversing idler pinion whereby it may be shifted longitudinally with reference to the driving and clutch pinions as well as radially therefrom.

In testimony whereof I hereunto affix my signature in the presence of two witnesses.

BRIAN CHARLES PALMER.

Witnesses:
F. DUCASSE,
GEO. J. CORBETT.